US007134643B1

(12) United States Patent
Williams et al.

(10) Patent No.: US 7,134,643 B1
(45) Date of Patent: Nov. 14, 2006

(54) MOTORCYCLE LIFT STRAPPING SYSTEM

(76) Inventors: Eric G. Williams, 6440 Panorama Ct., Alta Loma, CA (US) 91737; Frank Aceves, Jr., 6440 Panorama Ct., Alta Loma, CA (US) 91737

( * ) Notice: Subject to any disclaimer, the term of this patent is extended or adjusted under 35 U.S.C. 154(b) by 0 days.

(21) Appl. No.: 11/186,374

(22) Filed: Jul. 22, 2005

(51) Int. Cl.
*B60P 1/48* (2006.01)

(52) U.S. Cl. .................. 254/134; 254/10 R; 254/10 C

(58) Field of Classification Search .............. 254/10 R, 254/10 B, 10 C, 124, 133 R, 134, 131
See application file for complete search history.

(56) References Cited

U.S. PATENT DOCUMENTS

| | | | |
|---|---|---|---|
| 5,271,603 A | 12/1993 | White | |
| D378,155 S | 2/1997 | Bartow et al. | |
| 5,769,396 A | 6/1998 | Tischendorf | |
| 6,092,787 A | 7/2000 | Nayman | |
| 6,561,487 B1 | 5/2003 | Siglock | |
| 2003/0089896 A1 | 5/2003 | Reinikka et al. | |

*Primary Examiner*—Robert C. Watson

(57) ABSTRACT

A motorcycle lift strapping system for securing a motorcycle to a motorcycle lift assembly having a pair of elongated members includes a pair of elongated supports each of which is attached to and extends along one of elongated members. A first rod and a second rod each have first and second ends. Each of the first and second ends has a threaded aperture extending therein. A plurality of threaded securing members each has an end having a loop attached thereto. Each of the securing members is extended into one of the apertures. A plurality of couplers couples each of the first and second rods to one of the supports. The couplers are rotatable around a respective one of the rods. Straps are attached to the loops and wrapped around the motorcycle to. Rotating the rods so that the securing members extend outwardly of the rods tightens the straps.

6 Claims, 7 Drawing Sheets

MOTORCYCLE LIFT STRAPPING SYSTEM

BACKGROUND OF THE INVENTION

1. Field of the Invention

The present invention relates to lift fastening devices and more particularly pertains to a new lift fastening device for securing a motorcycle to a motorcycle lift assembly so that the motorcycle is not easily tipped off of the lift assembly.

2. Description of the Prior Art

The use of lift fastening devices is known in the prior art. U.S. Pat. No. 5,759,396 describes a generally conventional motorcycle lift assembly adapted for being positioned under a motorcycle and for lifting the motorcycle off of a ground surface when actuated. A similar device is shown in U.S. Pat. No. 5,271,603 which shows a lift which is used for vehicle. A stabilizer for lifting jacks is shown in U.S. Pat. No. 6,561,487 and shows plates that are selectively extendable over a motorcycle frame so that the frame is positioned between a lift and the plates. The plates aid to stabilize the motorcycle positioned on the lift.

While these devices fulfill their respective, particular objectives and requirements, the need remains for a device that allows for more effective stabilization of a motorcycle on a motorcycle lift. In particular, the device should be readily adjustable to allow for variously sized motorcycles and to reduce the need for the repositioning of the motorcycle on the lift assembly in order to ensure proper usage of the device.

SUMMARY OF THE INVENTION

The present invention meets the needs presented above by generally comprising an attachment system for removably securing a motorcycle to a motorcycle lift assembly. The motorcycle lift assembly has a pair of horizontally orientated elongated members that are orientated parallel to each other. The motorcycle is positioned over the elongated members and the lift assembly actuated so that the motorcycle is lifted upwardly off of a ground surface. The system includes a pair of elongated supports each of which is attached to and extends along one of the elongated members. The supports are each positioned on a respective outer surface of each of the elongated members. A first rod and a second rod each have a first end, a second end and a peripheral wall extending between the first and second ends. Each of the first and second ends has a threaded aperture extending therein. A plurality of threaded securing members each has an end having a loop attached thereto. Each of the securing members is extended into one of the apertures so that each of the first and second rods has two securing members threadably coupled thereto and the loops extend outwardly away from the first and second ends of the rods. A plurality of couplers couples each of the first and second rods to one of the supports. Each of the first and second rods has two couplers attached thereto. The couplers are rotatable around a respective one of the first and second rods and each of the couplers is attached to one of the supports. Each of a pair of straps has a pair of hooked ends. The hooked ends are each removably attached to one of the loops after the straps are wound about the motorcycle. The rod may be rotated in a first direction so that the securing members are extended outwardly from the first and second rods and the straps are pulled taut against the motorcycle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
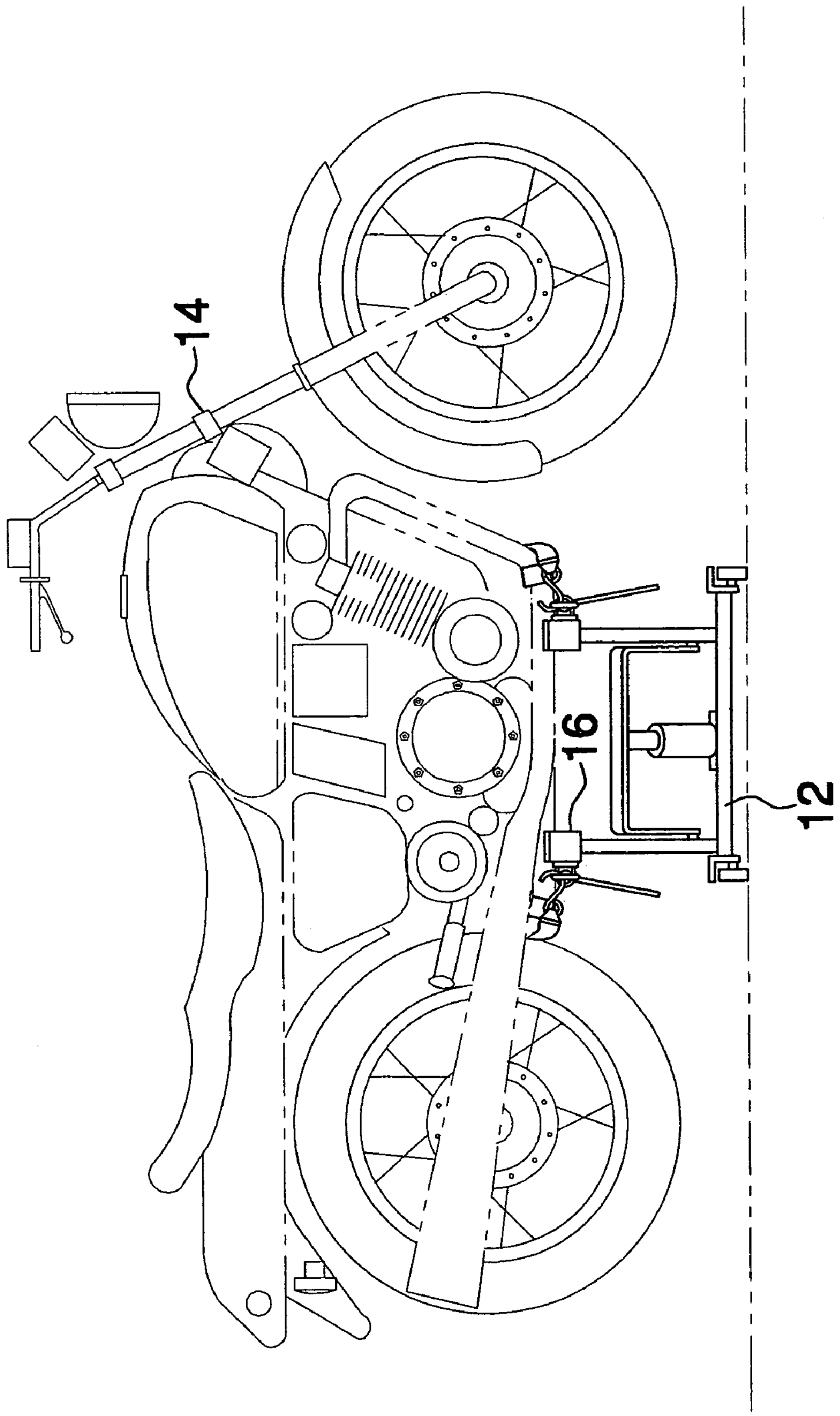
FIG. 1 is a side in-use view of a motorcycle lift strapping system according to the present invention.
Figure 2:
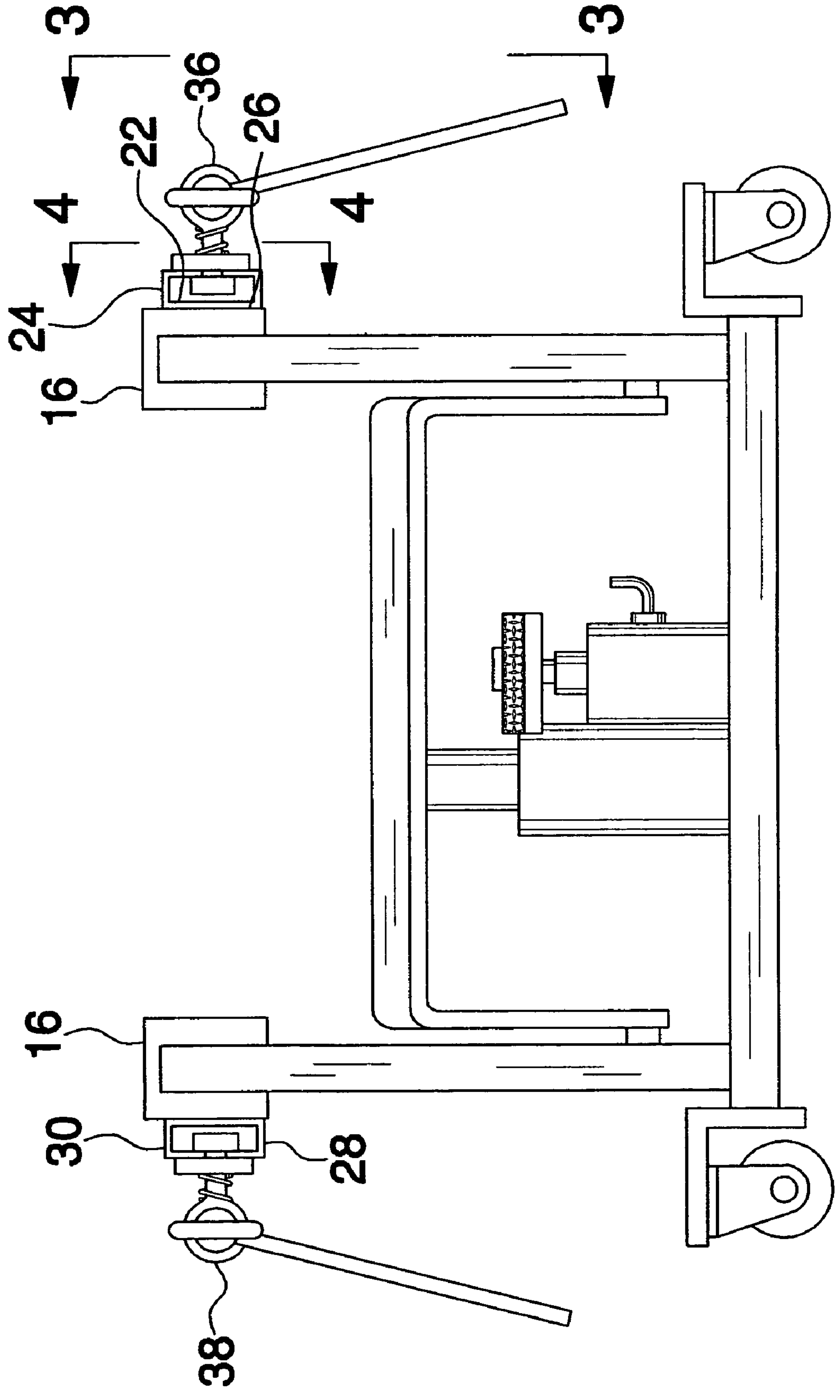
FIG. 2 is a side in-use view of the present invention.
Figure 3:
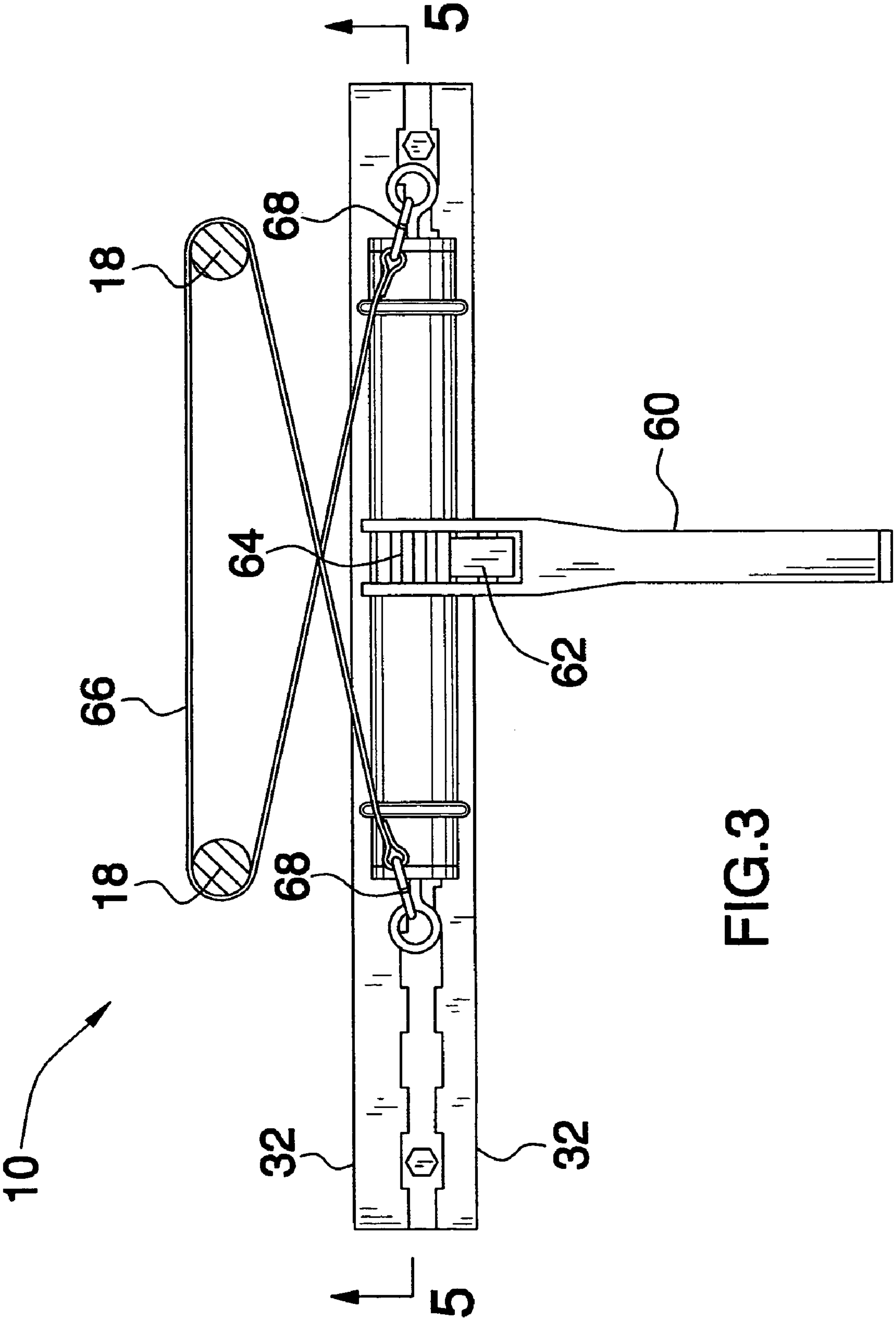
FIG. 3 is a front view of the present invention taken along line 3—3 of FIG. 2.
Figure 4:
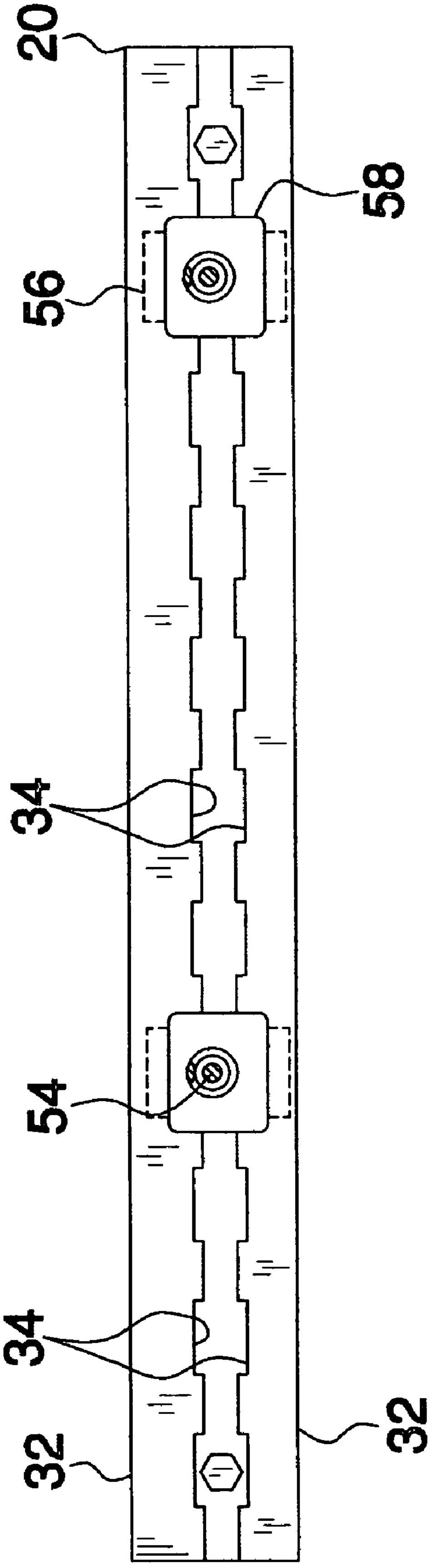
FIG. 4 is a cross-sectional view taken along line 4—4 of FIG. 2 of the present invention.

With reference now to the drawings, and in particular to FIGS. 1 through 8 thereof, a new lift fastening device embodying the principles and concepts of the present invention and generally designated by the reference numeral 10 will be described.

As best illustrated in FIGS. 1 through 8, the motorcycle lift strapping system 10 generally comprises a system that is attached to motorcycle lift assembly 12 and aids in securing a motorcycle 14 to the lift assembly 12. The motorcycle lift assembly 12 is conventional pneumatic or hydraulic jack and has a pair of horizontally orientated elongated members 16. The elongated members 16 are orientated parallel to each other and are spaced from each other. A motorcycle 14 is positioned over the elongated members 16 and the lift assembly 12 may be actuated so that the elongated members 16 abut the frame 18 of the motorcycle 14 and the motorcycle 14 is lifted upwardly off of a ground surface.

The system 10 includes a pair of supports 20. Each of the supports 20 is elongated and each of the supports 20 is attached to and extends along one of elongated members 16. The supports 20 are positioned on a respective outer surface of each of the elongated members 16 so that the supports 20 face away from each other. Each of the supports 20 includes a plate 22 that is attached to a respective one of the elongated members 16 by fasteners or welding. The plate 22 has an upper edge 24 and a lower edge 26. A lower wall 28 is attached to and extends along the lower edge 26. The lower wall 28 has an outer edge positioned opposite with respect to the plate 22. An upper wall 30 is attached to and extends along the upper edge 24. The upper wall 30 has an outer edge positioned opposite with respect to the plate 22. Each of the supports 20 further includes a pair of flanges 32 each attached to one of the outer edges of the upper 30 and lower 28 walls. The flanges 32 extend toward each other. Each of the flanges 32 has a plurality of notches 34 therein. The notches 34 in a first of the flanges 32 are aligned with the notches 34 in a second of the flanges 32.

A first rod 36 and a second rod 38 are provided. Each of the first 36 and second rods 38 has a first end 40, a second end 42 and a peripheral wall 43 extending between the first 40 and second 42 ends. Each of the first 40 and second 42 ends has a threaded aperture 44 extending therein.

Each of a plurality of threaded securing members 46 has an end having a loop 48 attached thereto. The securing members 46 are each extended into one of the apertures 44 so that each of the first 36 and second 38 rods has two securing members 46 threadably coupled thereto so that the loops 48 extend outward from the rods 36, 38.

A plurality of couplers 50 couples each of the first 36 and second 38 rods to one of the supports 20. Each of the first 36 and second 38 rods preferably has two couplers 50 attached thereto. Each of the couplers 50 includes a ring portion 52 that extends around the peripheral walls 43 one of the first 36 and second 38 rods and is rotatable around a respective one of the first 36 and second 38 rods. The couplers 50 include a post 54 extending away from one of the first 36 and second 38 rods and between a pair of the flanges 32. The posts 54 each have a free end forming an anchor 56 that has a width greater than a distance between an adjacent pair of the flanges 32. The anchors 56 hold the rods 36, 38 to the supports 20. The anchors 56 are selectively positionable along a length of the supports 20, which in turn allows the position of the rods 36, 38 to be selectively adjusted as needed along the supports 20.

A plurality of locking members 58 is provided and each is slidably positioned on one of posts 54. The locking members 58 are selectively positionable in a first position engaging, or being positioned in, the notches 34 or in a second position between the flanges 32 and a corresponding one of the first 36 and second rods 38. The locking members 58 are biased in the first position by springs wound around the posts 54 and extending between the rods 36, 38 and the locking members 58. When the locking members 58 are in the second position, the couplers 50 are free to move along supports 20.

Each of a pair of handles 60 is rotatably coupled to one of the peripheral walls 43 of the first 36 and second 38 rods. The handles 60 each include a pawl 62 at their proximal ends with respect to the first 36 and second 38 rods. Each of the first 36 and second 38 rods has a fixed gear wheel 64 attached thereto. The gear wheels 64 each have a longitudinal axis that is collinear with the longitudinal axis of an attached one of the first 36 and second 38 rods. Each of the pawls 62 is in mechanical communication with one of the gear wheels 64. The pawls 62 and gear wheels 64 form a conventional ratcheting assembly for selectively rotating the rods 36, 38 with respect to the couplers.

Figure 5:
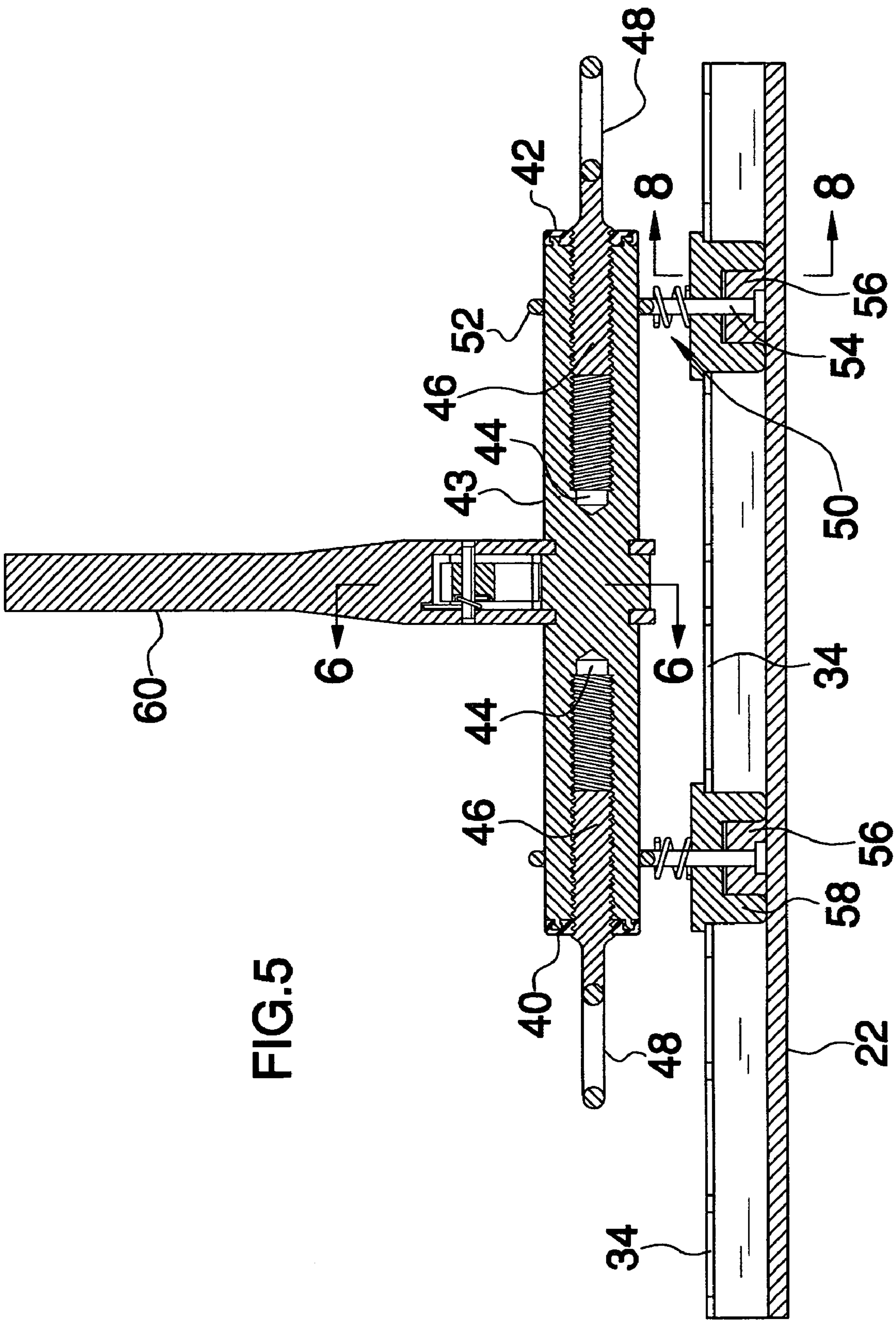
FIG. 5 is a cross-sectional view taken along line 5—5 of FIG. 3 of the present invention.
Figure 6:
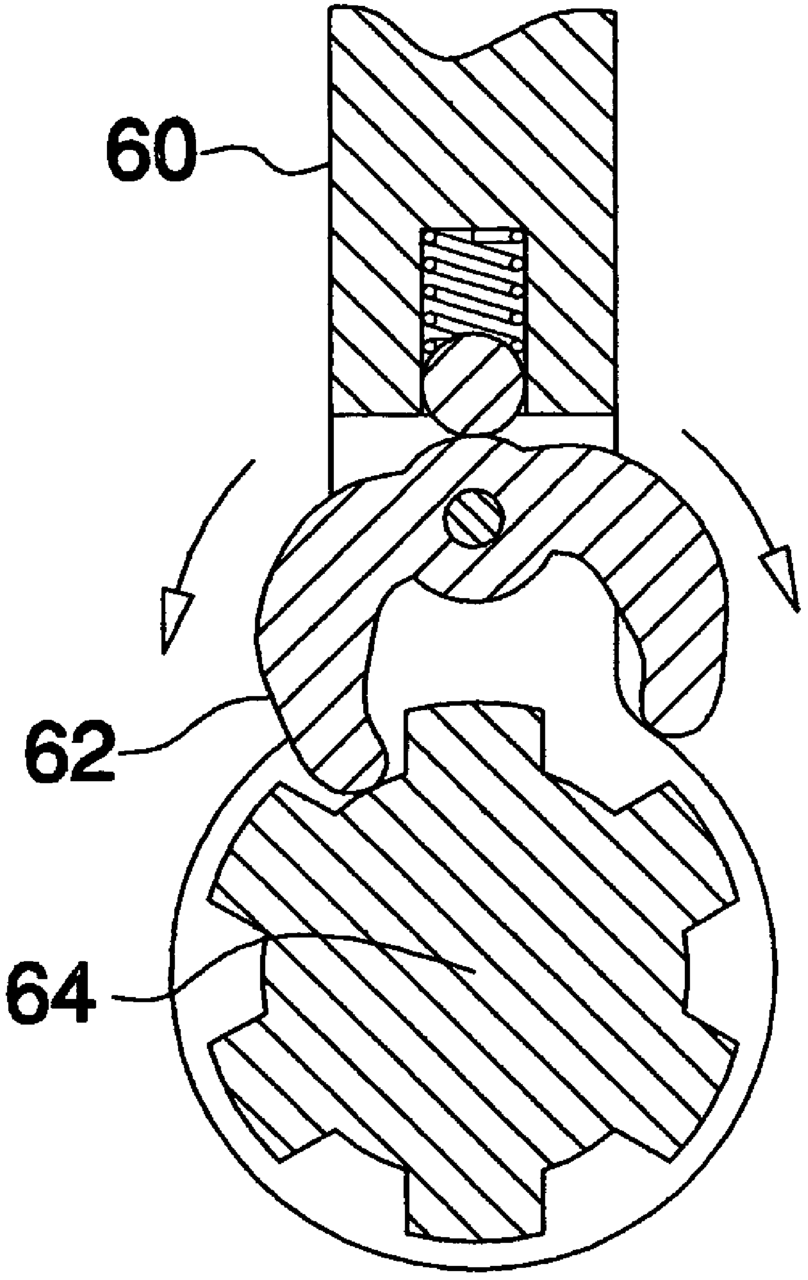
FIG. 6 is a cross-sectional view taken along line 6—6 of FIG. 5 of the present invention.
Figure 7:
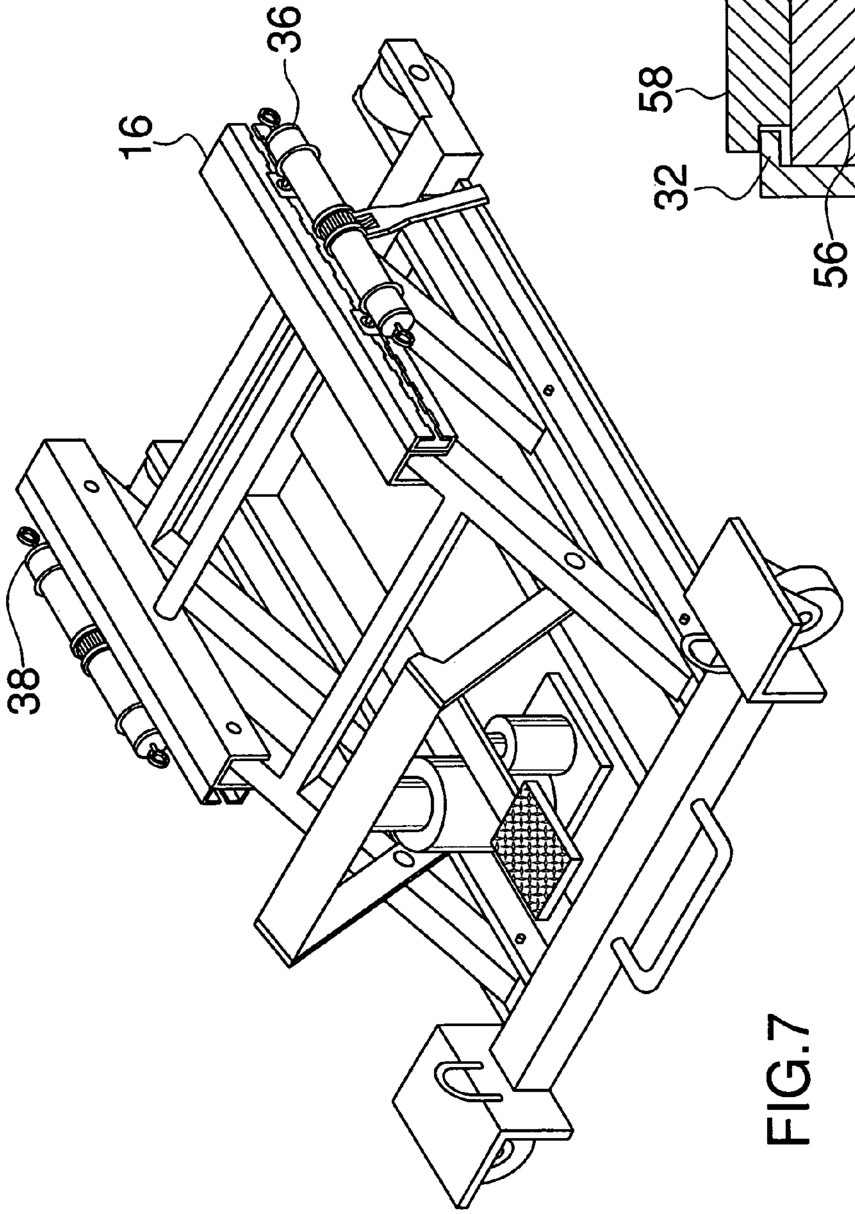
FIG. 7 is a perspective in-use view of the present invention.
Figure 8:
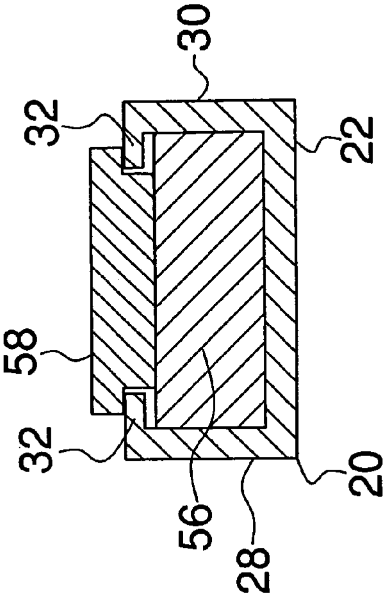
FIG. 8 is a cross-sectional view taken along line 8—8 of FIG. 5 of the present invention.

In use, the securing members 46 are fully extended into the apertures 44 by turning each in a same direction with respect to each other. Each of a pair of straps 66 is extended around the frame 18 of the motorcycle 14. Each of the straps 66 has a pair of hooked ends 68. Each of the hooked ends 68 is removably attached to one of the loops 48 after the straps 66 are wound about the frame 18 of the motorcycle 14 as shown in FIG. 5. The rod, or rods, is then rotated in a first direction with the couplers 50, which is the same direction of rotation of the securing members 46 when they are extended into the rods 36, 38. While the rods rotate, the straps 66 prevent the securing members 46 from rotating. Thus, while the rods are rotated, the securing members 46 move outward from the rods 36, 38 and the straps 66 are tightened. When finished, the handles 60 are used in the opposite direction to loosen the straps 66.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An attachment system for removably securing a motorcycle to a motorcycle lift assembly, the motorcycle lift assembly having a pair of horizontally orientated elongated members, the elongated members are orientated parallel to each other, the motorcycle being positioned over the elongated members and the lift assembly actuated such that the motorcycle is lifted upwardly off of a ground surface, said system comprising:

a pair of supports, each of said supports being elongated, each of said supports being attached to and extending along one of elongated members, each of said supports being positioned on a respective outer surface of each of said elongated members;

a first rod and a second rod each having a first end, a second end and a peripheral wall extending between said first and second ends, each of said first and second ends having a threaded aperture extending therein;

a plurality of threaded securing members each having an end having a loop attached thereto, each of said securing members being extended into one of said apertures such that each of said first and second rods has two securing members threadably coupled thereto;

a plurality of couplers coupling each of said first and second rods to one of said supports, each of said first and second rods having two couplers attached thereto, each of said couplers being rotatable around a respective one of said first and second rods, each of said couplers being attached to one of said supports;

a pair of straps, each of said straps having a pair of hooked ends, each of said hooked ends being removably attached to one of said loops such that said straps are wound about the motorcycle; and wherein said rod may be rotated in a first direction such that said securing members are extended outwardly from said first and second rods and said straps are pulled against the motorcycle.

2. The system according to claim 1, further including:

each of said supports comprising;

a plate being attached to respective one of said supports, said plate having an upper edge and a lower edge;

a lower wall being attached to and extending along said lower edge, said lower wall having an outer edge positioned opposite with respect to said plate;

an upper wall being attached to and extending along said upper edge, said upper wall having an outer edge positioned opposite with respect to said plate;

a pair of flanges, each of said flanges being attached to one of said outer edges of said upper and lower walls, said flanges extending toward each other;

each of said posts having a free end forming an anchor having a width greater than a distance between an adjacent pair of said flanges, said anchors being selectively positionable along a length of said supports.

3. The system according to claim 2, wherein each of said flanges having a plurality of notches therein, said notches in a first of said flanges being aligned with said notches in a second of said flanges, a plurality of locking members, each of said locking members being positioned on one of posts, each of said locking members being selectively positionable in a first position engaging said notches or in a second position between said flanges and a corresponding one of said first and second rods.

4. The system according to claim 3, wherein each said locking members is biased in said first position.

5. The system according to claim 4, further including a pair of handles, each of said handles being rotatably coupled to one of said peripheral walls of said first and second rods, each of said handles including a pawl, each of said first and second rods having a gear wheel attached thereto, each of said gear wheels having a longitudinal axis being collinear with an attached one of said first and second rods, each of said pawls being in mechanical communication with one of said gear wheels.

6. The system according to claim 1, further including a pair of handles, each of said handles being rotatably coupled to one of said peripheral walls of said first and second rods, each of said handles including a pawl, each of said first and second rods having a gear wheel attached thereto, each of said gear wheels having a longitudinal axis being collinear with an attached one of said first and second rods, each of said pawls being in mechanical communication with one of said gear wheels.

* * * * *